Jan. 11, 1949.　　　J. A. JOHNSON ET AL　　　2,459,079
GAS TURBINE POWER UNIT

Filed June 22, 1944　　　　　　　　　　　4 Sheets-Sheet 1

Inventors
John Algot Johnson
Clarence E. Kenney
by K. A. Wyman
Attorney

Patented Jan. 11, 1949

2,459,079

UNITED STATES PATENT OFFICE 2,459,079

GAS TURBINE POWER UNIT

John Algot Johnson, Wauwatosa, and Clarence E. Kenney, West Allis, Wis., assignors to Allis-Chalmers Manufacturing Company, Milwaukee, Wis., a corporation of Delaware Application June 22, 1944, Serial No. 541,562

6 Claims. (Cl. 60—41)

This invention relates to continuous combustion gas turbine systems embodying separate, independently rotating high and low pressure series-flow connected compressor and power turbines with regenerative heating of the compressed air prior to its introduction into the combustion chamber and reheating of the motive fluid discharged from the high pressure turbine and has for its object the provision of an improved power plant in which the turbines, heat exchangers and combustion chambers are correlated in a novel manner to minimize expansion produced stresses and to obtain uniform air distribution, uniform combustion and a high degree of regenerative heating in a compact unit requiring a minimum of space for its installation and operation.

The manner of correlating elements to attain the hereinabove specified object and the advantages of such correlation will become readily apparent as the disclosure progresses and particularly points out additional features considered of special importance and of general application although shown and described as applied to a type of power plant adapted for marine use.

Accordingly, the invention may be considered as consisting of the various correlations of elements and arrangements of parts as is more fully set forth in the appended claims and in the detailed description, reference being had to the accompanying drawings, in which:

Figure 1:
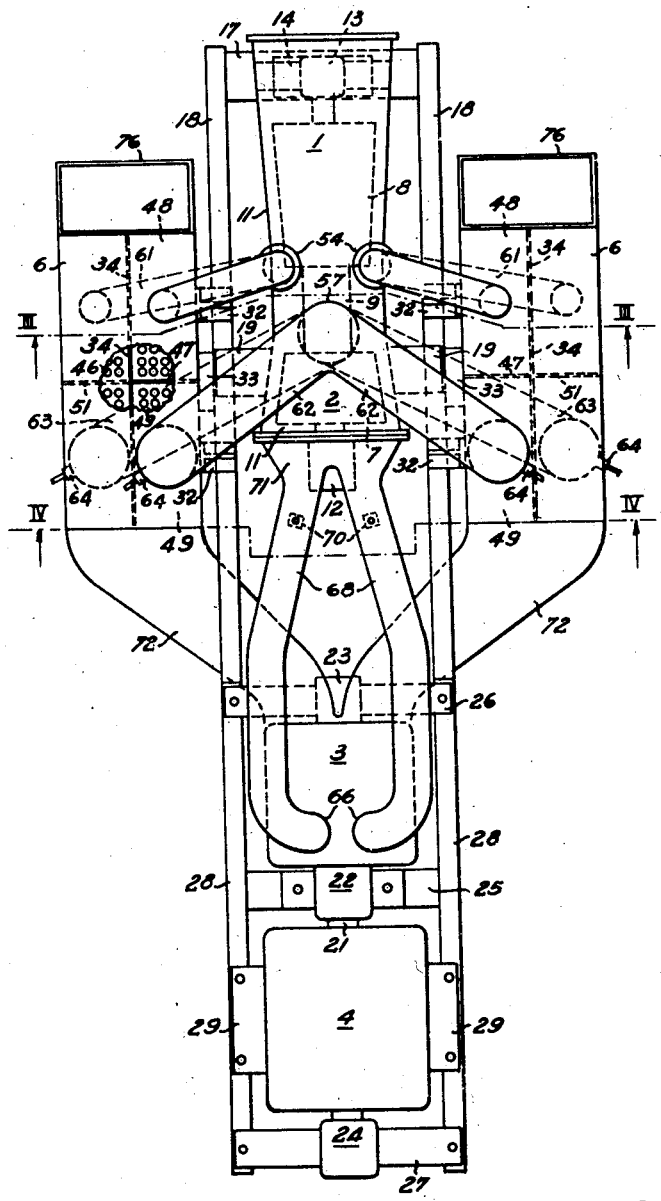
Fig. 1 is a plan view of a power plant embodying the invention with portions broken away to better show the arrangement of parts.
Figure 2:
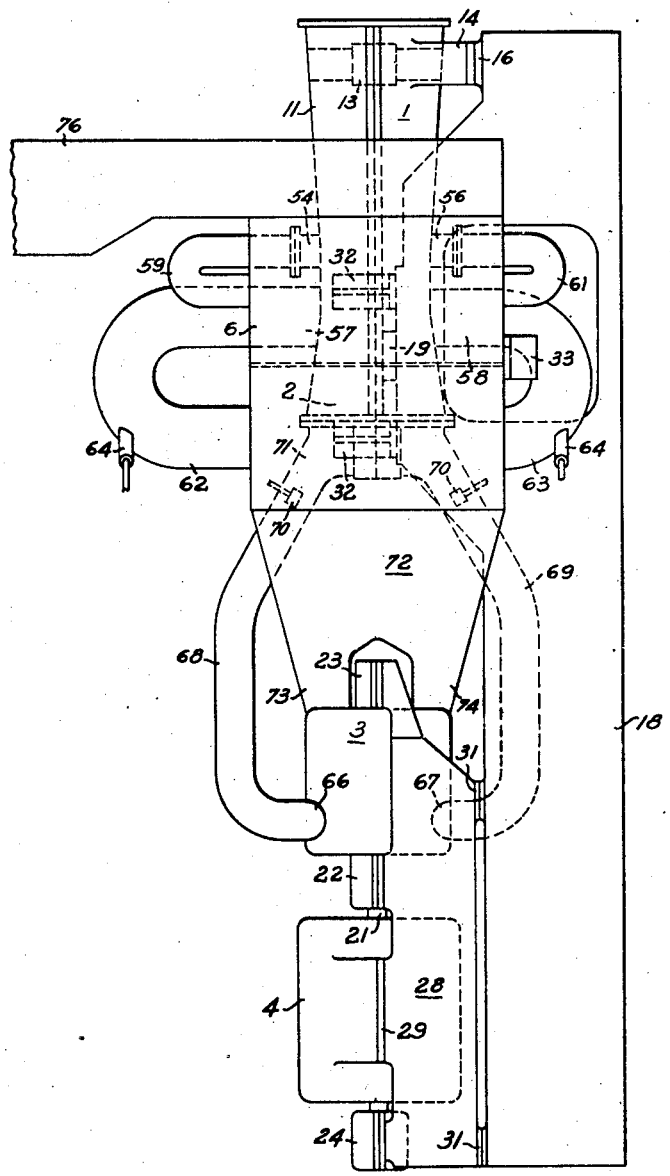
Fig. 2 is a side elevation of the power plant shown in Fig. 1.

Referring particularly to Figs. 1 and 2, it is seen that the invention may be applied to a gas turbine power plant embodying a compressor 1, a high pressure turbine 2, a low pressure power turbine means 3, a generator 4, and a pair of similar heat exchangers 6. Turbine 2 has its rotor 7 drivingly connected with the rotor 8 of compressor 1 by means of a common shaft 9 and these two rotors are in this instance enclosed in a common casing 11 including at its opposite ends bearings 12 and 13 supporting the adjacent shaft portions of the rotors 7 and 8, respectively.

Figure 4:
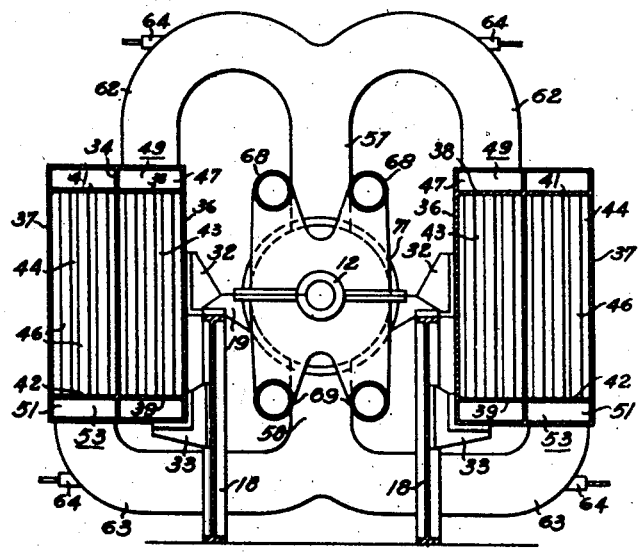
Fig. 4 is a section taken on line IV—IV of Fig. 1.

The compressor end of casing 11 is provided with a depending support 14 mounted on a pad or the like 16 carried by the mid portion of a main frame cross member 17 which in turn interconnects a pair of substantially rigid, parallel side beams or members 18. The turbine end of casing 11 is provided with a pair of oppositely projecting supports 19 mounted on the adjacent underlying portions of the side beams 18 as best shown in Fig. 4; the supports 14 and 19 providing in effect a three point mounting for the casing 11.

Turbine 3 is drivingly connected with generator 4 by means of a shaft 21 supported by a bearing 22 supported by connecting member 25 and the oppositely projecting shaft portions of turbine 3 and generator 4 are supported in bearings 23 and 24, respectively, which are in turn mounted on cross members 26 and 27 interconnecting a pair of substantially rigid auxiliary frame side beams or members 28. The shell portions of bearings 22 and 23 are formed integral with and constitute the supports for the casing of turbine 3 and the casing of generator 4 is provided with a pair of oppositely projecting supports 29 mounted on the adjacent underlying portions of the auxiliary frame side beams 28. The auxiliary frame comprising side beams 28 and cross members 26 and 27 is supported as a unit on the underlying main frame by means of a plurality of pads 31 as is best indicated in Fig. 2.

Figure 3:
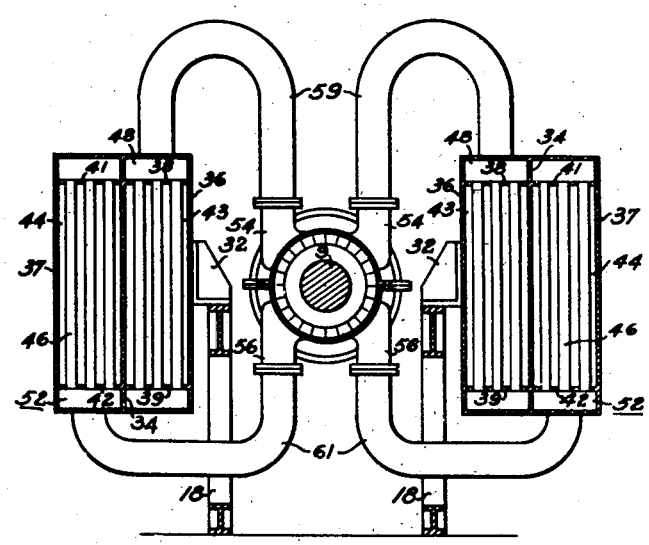
Fig. 3 is a section taken on line III—III of Fig 1.

The heat exchangers are disposed in parallel relation alongside the outer web surfaces presented by the main frame side beams 18 and in opposed relation to opposite sides of the turbine and compressor casing 11. Each heat exchanger is mounted on and carried by the adjacent side beam 18 by means of vertically spaced brackets of which the upper brackets 32 project inward from the side wall of the heat exchanger in superimposed supporting relation with respect to the top surface of the side beam and of which the lower bracket 33 projects outward from the web portion of the adjacent side beam in underlying supporting relation to the bottom portion of the heat exchanger as is best indicated in Figs. 3 and 4.

Each heat exchanger 6 includes a control vertical partition 34 extending therethrough in parallel passage forming relation with respect to the inner and outer side walls 36 and 37, respectively, inner and outer pairs of upper and lower tube sheets 38, 39 and 41, 42, respectively, forming with said partition and side walls inner and outer parallel exhaust gas passages 43 and 44, a plurality of vertical tubes 46 extending through and carried by the tube sheets 38, 39, 41 and 42 to place the spaces above the tube sheets 38 and 41 in communication with the spaces below the tube sheets 39 and 42, an upper inner transverse partition 47 dividing the space above tube sheet 38 into two chambers 48 and 49, and a lower outer transverse partition 51 dividing the space beneath tube sheets 42 into two chambers 52 and 53. The space beneath tube sheet 39 and the tubes 46 which communicate with such space place chamber 48 in communication with chamber 49 and likewise the space above tube sheet 41 and the tubes 46 which communicate with such space place chamber 52 in communication with chamber 53. Stated differently, the space beneath tube sheet 39 and the tubes 46 which in conjunction with such space places chamber 48 in communication with chamber 49 form in effect an inner pair of series flow connected conductors and the space above tube sheet 41 and the tubes 46 which in conjunction with such space places chamber 52 in communication with chamber 53 form in effect an outer pair of series flow connected conductors.

The compressor portion of casing 11 is provided with four circumferentially spaced compressed air outlets arranged in upwardly and downwardly directed pairs designated 54 and 56, respectively, (see Fig. 3) and the turbine portion of casing 11 is provided with a pair of diametrically opposed top and bottom inlets designated 57 and 58, respectively. The compressed air discharged from the compressor 1 is conducted to the heat exchangers 6 by a first group of spaced conduits including an upper pair of conduits 59 connecting the compressor outlets 54 with the proximate upper chambers 48 and a lower pair of conduits 61 connecting the compressor outlets 56 with the proximate lower chambers 52 as is best illustrated in Figs. 1 and 3. The compressed air entering each chamber 48 flows downward therefrom through a group of tubes 46 into the space beneath the lower tube sheet 39 and then upward through another group of tubes 46 into the adjacent upper chamber 49. Likewise, compressed air entering each lower chamber 52 flows upward therefrom through a group of tubes 46 into the space above the upper tube sheet 41 and then downward through another group of tubes 46 into the adjacent lower chamber 53. The compressed air entering the chambers 49 and 53 of heat exchangers 6 is conducted therefrom to the symmetrical turbine inlets 57 and 58 by a second group of conduits including an upper pair of conduits 62 connecting chambers 49 with the inlet 57 and a lower pair of conduits 63 connecting the chambers 53 with inlet 58. The heat exchanger end of each conduit 62 and 63 is preferably provided with a burner or other means designated 64 for highly heating the air by combusting fuel therein prior to its reaching the turbine inlets 57 and 58.

Power turbine means 3 is mounted in spaced coaxial relation with respect to compressor turbine 2 with its exhaust end disposed adjacent and opposing the exhaust end of the compressor turbine. The remote or inlet end of turbine 3 is provided with four circumferentially spaced inlets arranged in upper and lower pairs designated 66 and 67, respectively (see Figs. 1 and 2), and the exhaust from the compressor turbine 2 is conducted into power turbine 3 by a third group of spaced conduits including an upper pair of conduits 68 connecting the turbine exhaust end of casing 11 with the inlets 66 and a lower pair of conduits 69 connecting said exhaust end of casing 11 with the inlets 67. The compressor turbine ends of conduits 68 and 69 are preferably merged to form a single exhaust gas receiving conduit structure 71 terminating in a generally cylindrically flanged end which abuts and is secured to the flanged, turbine exhaust end of the casing 11 as is best shown in Figs. 1, 2 and 3. Each conduit 68 and 69 is preferably provided with a burner or other means designated 70 for reheating the exhausted motive fluid by combusting fuel therein prior to its reaching the turbine inlets 66 and 67.

The exhaust from the power turbine 3 is conducted into the adjacent ends of the inner and outer gas passages 43 and 44 in heat exchangers 6 by means of a fourth group or pair of conduits 72 which connect the passages 43 and 44 in each heat exchanger with the exhaust end of the power turbine means, turbine 3. In this connection, the turbine end of each conduit 72 is preferably divided into vertically spaced upper and lower portions designated 73 and 74, respectively (see Fig. 2), and the upper and lower portions of one conduit merge with the corresponding portions of the other conduit as best indicated in Fig. 1 to facilitate connection with the exhaust portion of turbine 3. The conduits 72 project from turbine 3 in diverging relation and each conduit passes between a vertically spaced pair of the conduits 66 and 69 as is clearly indicated in Figs. 1 and 2; the cross sectional area and configuration of each conduit 72 increasingly changes as it approaches its heat exchanger to conform with the combined cross sectional area and configuration of the inner and outer gas passages 43 and 44.

The exhaust gas entering the passages 43 and 44 in heat exchangers 6 flows therethrough around tubes 46 thereby regeneratively heating the compressed air flowing through such tubes and out the upwardly extending stack portions 76. Operation of the system herein disclosed should now be apparent and since a particular mode of operation forms no part of the present invention, a further description in this connection is deemed unnecessary. However, it should be particularly noted that the compressor 1 and turbine 2 are operatively mounted in axially alined relation on a support, the main frame comprising side beams 18 and cross member 17, with the inlet end of the turbine disposed immediately adjacent the discharge end of the compressor and that the power turbine means, turbine 3 and generator 4, are independently mounted on a separate support, the auxiliary frame comprising side beams 28 and cross members 25, 26 and 27, in coaxial relation with respect to the compressor turbine with the exhaust end of turbine 3 disposed adjacent and in axially alined opposed relation with respect to the exhaust end of turbine 2. In this connection, it should also be noted that the parts of turbines 2 and 3 interconnected by conduits 68 and 69 are in substantial axial alinement thereby minimizing expansion difficulties as it is only necessary to provide for the longitudinal expansion and contraction of such conduits, and that in general the novel and simplified correlation of elements herein disclosed provides a compact power plant which requires a minimum of space for its installation and operation and minimizes expansion produced stresses while affording uniform air distribution, uniform combustion and a high degree of regenerative heating.

Figure 5:
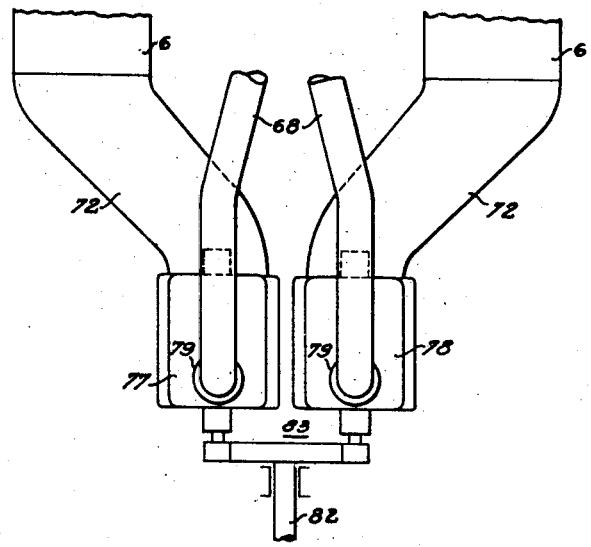
Fig. 5 is a plan view of a modified power turbine means.
Figure 6:
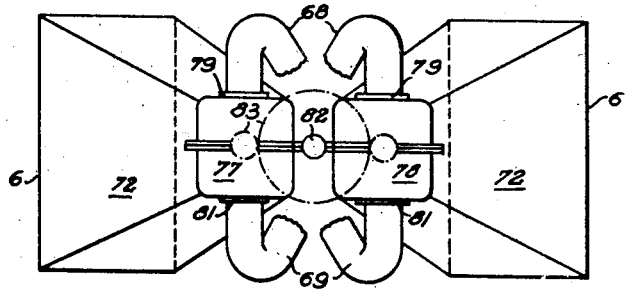
Fig. 6 is an end view of the structure shown in Fig. 5.

The invention is applicable to gas turbine systems of the type hereinbefore mentioned in which the power turbine means comprises a plurality of low pressure turbines as is obvious from a consideration of Figs. 5 and 6 showing one arrangement of low pressure turbines, designated 77 and 78, which may be readily substituted for the low pressure turbine 3 of Figs. 1–4, inclusive; the same reference numerals being employed to designate corresponding parts in the interest of simplicity. In this modification, each turbine is provided with a pair of diametrically opposed upper and lower inlets designated 79 and 81 which are connected with the exhaust of the compressor turbine by means of the conduits 68 and 69 as in Figs. 1–4, inclusive the upper conduits 68 being connected with the inlets 79 and the lower conduits 69 being connected with inlets 81, and the exhaust of each turbine is connected with the adjacent heat exchanger 6 by a separate conduit 72. The turbine ends of conduits 72 are for obvious reasons not divided and merged in this modification as shown in Figs. 1 and 2. Turbines 77 and 78 are preferably symmetrically arranged with respect to an axis coincident with the common axis of compressor 1 and turbine 2 and if desired, these turbines may be used to drive a single power transmitting shaft 82 by any suitable means or connections such as the gearing 83.

It should noow be obvious that in accordance with this invention, the compressor, compressor turbine, and power turbine means are preferably operatively mounted with the inlet of the compressor turbine disposed immediately adjacent the discharge end of the compressor and with the exhaust end of the power turbine means opposing the exhaust end of the compressor turbine; the heat exchangers being disposed along opposite sides of the compressor turbine preferably in parallel relation with respect to each other and with respect to the axis of the compressor turbine. In this connection, it is also preferably but unnecessary for the heat exchangers to have exhaust gas passages which extend therethrough in parallel relation with respect to each other and with respect to the axis of the compressor turbine and inner and outer pairs of series-flow connecting compressed air conductors which extend vertically through the exhaust gas passages.

A power plant obtained by modifying Figs. 1–4, inclusive, along the lines indicated in Figs. 5 and 6 affords all of the advantages hereinbefore mentioned and suggests other and different modifications which might be made without departing from the broad aspects of the invention. And it should therefore be understood that it is not intended to limit the invention to the exact correlations of elements and arrangements of parts herein shown and described for purposes of illustration as various modifications within the scope of the appended claims may occur to persons skilled in the art.

It is claimed and desired to secure by Letters Patent:

1. A compact gas turbine power plant comprising a compressor, a turbine drivingly connected with said compressor, a separate, independently rotating power turbine means, a supporting structure operatively mounting said compressor, compressor turbine and power turbine means with the inlet of the compressor turbine disposed immediately adjacent the discharge end of the compressor and with the exhaust end of the power turbine means opposing the exhaust end of the compressor turbine, a pair of heat exchangers mounted on said structure adjacent opposite sides of said compressor turbine in parallel relation with respect to each other and with respect to the longitudinal axis of the turbine, said heat exchangers each including means providing an exhaust gas passage extending therethrough in a direction approximately parallel to said axis and at least two pairs of conductors extending transversely through said exhaust gas passage each pair having a set of inlet and outlet connections said sets being on opposite sides of the heat exchanger and adjacent to the opposed ends of the compressor and compressor turbine, a first group of spaced conduits severally connecting the inlet of each pair of conductors with the discharge of the compressor, a second group of spaced conduits embodying combustion chamber means and severally connecting the outlet of each pair of conductors with the inlet of the compressor turbine, a third group of spaced conduits connecting the exhaust of the compressor turbine with the inlet of the power turbine means, and a fourth group of conduits severally connecting the exhaust of the power turbine means with the adjacent ends of the exhaust gas passages in said heat exchangers.

2. A compact gas turbine power plant comprising a compressor, a turbine drivingly connected with said compressor, a separate, independently rotating power turbine means, a supporting structure operatively mounting said compressor, compressor turbine and power turbine means with the inlet of the compressor turbine disposed immediately adjacent the discharge end of the compressor and with the exhaust end of the power turbine means opposite the exhaust end of the compressor turbine, a pair of heat exchangers mounted on said structure adjacent opposite sides of said compressor turbine in parallel relation with respect to each other and with respect to the longitudinal axis of the compressor turbine, said heat exchangers each including means providing an exhaust gas passage extending therethrough in a direction approximately parallel to said axis and two pairs of two-pass conductors extending transversely through said exhaust gas passage and each pair terminating in a set of inlet and outlet connections one of said sets being on a side of the heat exchanger opposite from the other set, the inlet connections being disposed adjacent the discharge end of the compressor and the outlet connections being disposed adjacent the inlet end of the compressor turbine, a first group of spaced conduits severally connecting circumferentially spaced portions of the compressor discharge with the adjacent inlet connections of said heat exchangers, a second group of spaced conduits embodying combustion chamber means and severally connecting the adjacent outlet connections of the heat exchangers with the compressor turbine inlet, a third group of spaced conduits connecting the exhaust of the compressor turbine with the inlet of the power turbine means, and a fourth group of conduits severally connecting the exhaust of the power turbine means with the adjacent ends of the exhaust gas passages in said heat exchangers.

3. A compact gas turbine power plant comprising a compressor, a turbine drivingly connected with said compressor, a separate, independently rotating power turbine means, a supporting structure mounting said compressor, compressor turbine and power turbine means with the inlet of the compressor turbine disposed immediately adjacent the discharge end of the compressor and with the exhaust end of the power turbine means opposing the exhaust end of the compressor turbine, a pair of heat exchangers mounted on said structure adjacent opposite sides of said compressor turbine in parallel relation with respect to each other and with respect to the longitudinal axis of the turbine, said heat exchangers each including means providing an exhaust gas passage extending therethrough in a direction approximately parallel to said axis and at least two pairs of conductors extending transversely through said exhaust gas passage each pair having a set of inlet and outlet connections said sets being on opposite sides of the heat exchanger and adjacent to the opposed ends of the compressor and compressor turbine, a first group of spaced conduits severally connecting one end of each pair of conductors with the discharge of the compressor, a second group of spaced conduits embodying combustion chamber means and severally connecting the other end of each pair of conductors with the inlet of the compressor turbine, a third group of spaced conduits arranged in upper and lower pairs connecting the compressor turbine exhaust with the inlet of the power turbine means, and a fourth group of conduits passing between the upper and lower pairs of conduits in said third group and severally connecting the exhaust of the power turbine means with the adjacent ends of the exhaust gas passages in said heat exchangers.

4. A compact gas turbine power plant comprising a compressor, a turbine drivingly connected with said compressor, a first supporting structure mounting said compressor and turbine in axially alined relation with the inlet of the compressor turbine disposed immediately adjacent the discharge end of the compressor, a separate, independently rotating power turbine means, a second supporting structure independently mounting said power turbine means with its exhaust end disposed adjacent and opposing the exhaust end of the compressor turbine, a pair of heat exchangers mounted on said first structure adjacent opposite sides of said compressor turbine in parallel relation with respect to each other and with respect to the longitudinal axis of the turbine, said heat exchangers each including means providing an exhaust gas passage extending therethrough in a direction approximately parallel to said axis and at least two pairs of conductors extending vertically through said exhaust gas passage and each having a set of inlet and outlet connections said sets being on opposite sides of the heat exchanger and adjacent to the opposed ends of the compressor and compressor turbine, a first group of spaced conduits severally connecting said inlet connections with a like number of compressor discharge outlets uniformly spaced with respect to the axis of said compressor, a second group of spaced conduits embodying combustion chamber means and severally connecting said outlet connections with a like number of compressor turbine inlets uniformly spaced with respect to the axis of the compressor turbine, a third group of spaced conduits embodying combustion chamber means and arranged in upper and lower pairs connecting exhaust portions of the compressor turbine uniformly spaced from its axis with a like number of similarly arranged inlet portions of the power turbine means, and a fourth group of conduits passing between the upper and lower pairs of conduits in said third group and severally connecting the exhaust of the power turbine means with the adjacent ends of the exhaust gas passages in said heat exchangers.

5. A compact gas turbine power plant comprising a compressor, a turbine drivingly connected with said compressor, a main supporting structure operatively mounting said compressor and compressor turbine with in inlet of the compressor turbine disposed immediately adjacent the discharge end of the compressor, an auxiliary supporting structure carried by said main structure and operatively mounting a separate, independently rotating power turbine means with the exhaust end of the power turbine means opposing the exhaust end of said compressor turbine, a pair of heat exchangers mounted on said main structure adjacent opposite sides of said compressor turbine in parallel relation with respect to each other and with respect to the longitudinal axis of said compressor and turbine, said heat exchangers each including means providing an exhaust gas passage extending therethrough in a direction approximately parallel to said axis and providing at least two pairs of conductors extending transversely through said exhaust gas passage and having top and bottom inlets disposed adjacent the discharge end of said compressor and top and bottom outlets disposed adjacent said compressor turbine, a first group of spaced conduits severally connecting the inlets of each pair of conductors with the discharge of the compressor, a second group of spaced conduits embodying combustion chamber means and severally connecting the outlets of each pair of conductors with the inlet of the compressor turbine, a third group of spaced conduits connecting the exhaust of the compressor turbine with the inlet of the power turbine means, and a fourth group of conduits severally connecting the exhaust of the power turbine means with the adjacent ends of the exhaust gas passages in said heat exchangers.

6. A compact gas turbine power plant comprising a compressor, a turbine drivingly connected with said compressor, a main supporting structure operatively mounting said compressor and turbine in axially aligned relation with the inlet of the compressor turbine disposed immediately adjacent the discharge end of the compressor, an auxiliary supporting structure, carried by said main structure, operatively mounting a separate, independently rotating power turbine means with the exhaust end of said power turbine disposed adjacent and opposing the exhaust end of the compressor turbine, a pair of heat exchangers mounted on said main structure adjacent opposite sides of said compressor turbine in parallel relation with respect to each other and with respect to the longitudinal axis of the turbine, said heat exchangers each including means providing an exhaust gas passage extending therethrough in a direction approximately parallel to said axis and providing at least two pairs of conductors extending vertically through said exhaust gas passage each pair having a set of inlet and outlet connections said sets being on opposite sides of the heat exchanger with said inlets disposed adjacent to the discharge end of the compressor and said outlets disposed adjacent to the compressor turbine, a first group of spaced conduits severally connecting said inlet connections with a like number of compressor discharge outlets uniformly spaced with respect to the axis of said compressor, a second group of spaced conduits embodying combustion chamber means and severally connecting said outlet connections with a plurality of compressor turbine inlets symmetrically arranged with respect to the axis of the compressor turbine, a third group of spaced conduits embodying combustion chamber means and arranged in upper and lower pairs connecting exhaust portions of the compressor turbine uniformly spaced from its axis with a like number of similarly arranged inlet portions of the power turbine means, and a fourth group of conduits passing between the upper and lower pairs of conduits in said third group and severally connecting the exhaust of the power turbine means with the adjacent ends of the exhaust gas passages in said heat exchangers.

JOHN ALGOT JOHNSON.
CLARENCE E. KENNEY.

REFERENCES CITED

The following references are of record in the file of this patent:

UNITED STATES PATENTS

| Number | Name | Date |
|---|---|---|
| 1,959,795 | Lysholm | May 22, 1934 |
| 2,095,991 | Lysholm | Oct. 19, 1937 |
| 2,312,605 | Traupel | Mar. 2, 1943 |

Certificate of Correction

Patent No. 2,459,079.                                                      January 11, 1949.

JOHN ALGOT JOHNSON ET AL.

It is hereby certified that error appears in the printed specification of the above numbered patent requiring correction as follows:

Column 8, line 14, claim 5, for the words "in inlet" read *the inlet*; and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*